United States Patent [19]

Carter et al.

[11] 4,386,673
[45] Jun. 7, 1983

[54] AXLE JOINT

[75] Inventors: Robert M. Carter; Robert J. Vrba, both of Cedar Rapids, Iowa

[73] Assignee: FMC Corporation, Chicago, Ill.

[21] Appl. No.: 327,314

[22] Filed: Dec. 4, 1981

[51] Int. Cl.³ .................................... B62D 55/08
[52] U.S. Cl. .................. 180/9.2 R; 180/9.48; 305/16
[58] Field of Search .......... 180/9.48, 9.0, 9.1, 180/6.48, 6.7, DIG. 2; 305/16, 60; 280/781

[56] References Cited

U.S. PATENT DOCUMENTS

| | | | |
|---|---|---|---|
| 3,037,571 | 6/1962 | Zelle | 180/9.48 |
| 3,894,598 | 7/1975 | Yeou | 180/9.48 |
| 3,907,055 | 9/1975 | Bertram et al. | 180/9.48 |
| 4,341,276 | 7/1982 | Furuichi | 180/9.48 |

Primary Examiner—Joseph F. Peters, Jr.
Assistant Examiner—Donn McGiehan
Attorney, Agent, or Firm—A. J. Moore; R. B. Megley

[57] ABSTRACT

An axle joint for connecting a removable tread member to the axle of a heavy vehicle. The tread member includes a window which provides ample clearance to loosely receive the end portion of an axle, which window and axle are then pivotally connected together by a pivot pin. A hydraulic cylinder is connected between the axle and the window and continuously applies a turning moment to the axle joint which firmly locks the axle within the window from relative movement in a vertical plane during operation of the vehicle.

10 Claims, 5 Drawing Figures

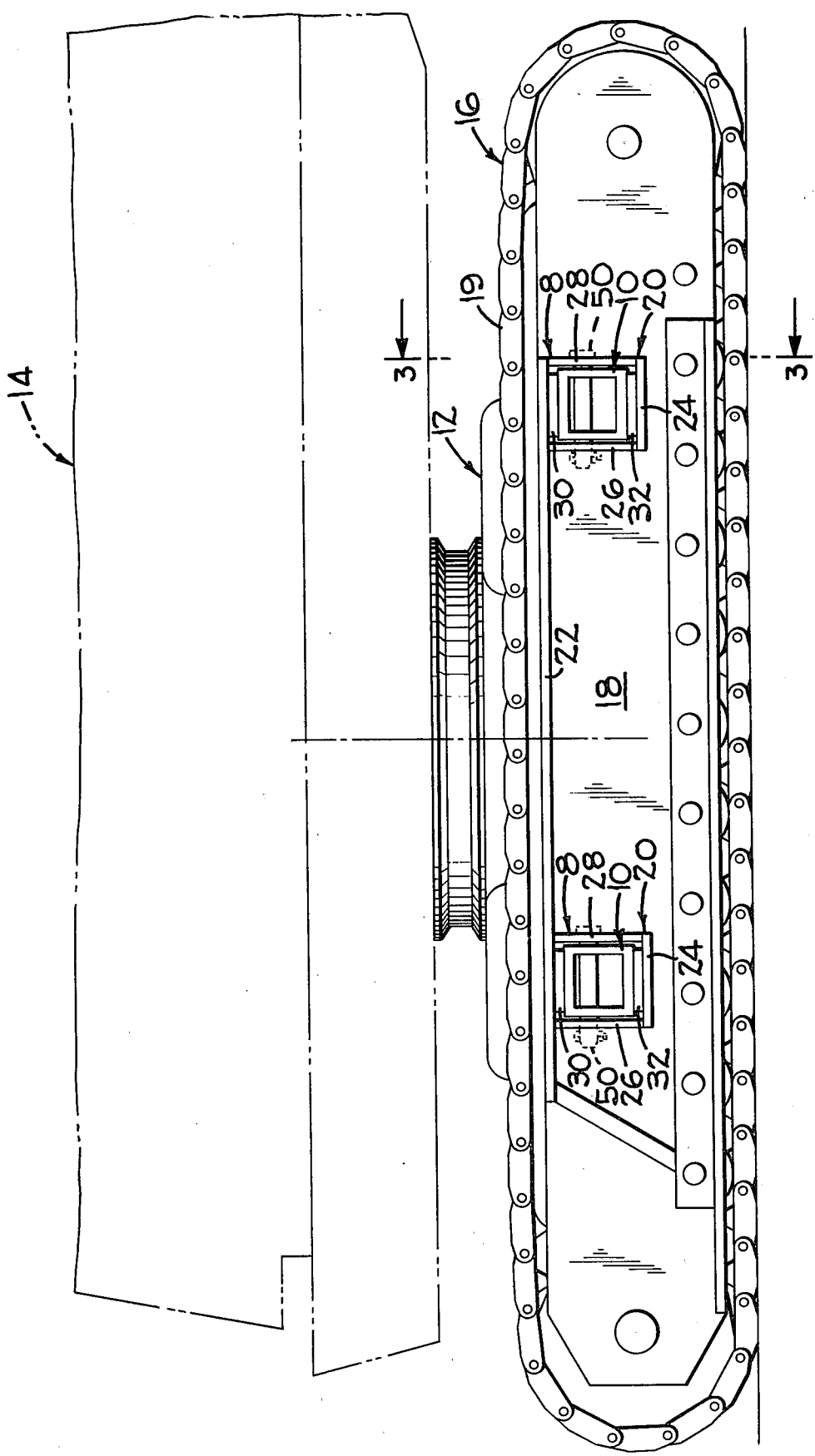
FIG_1

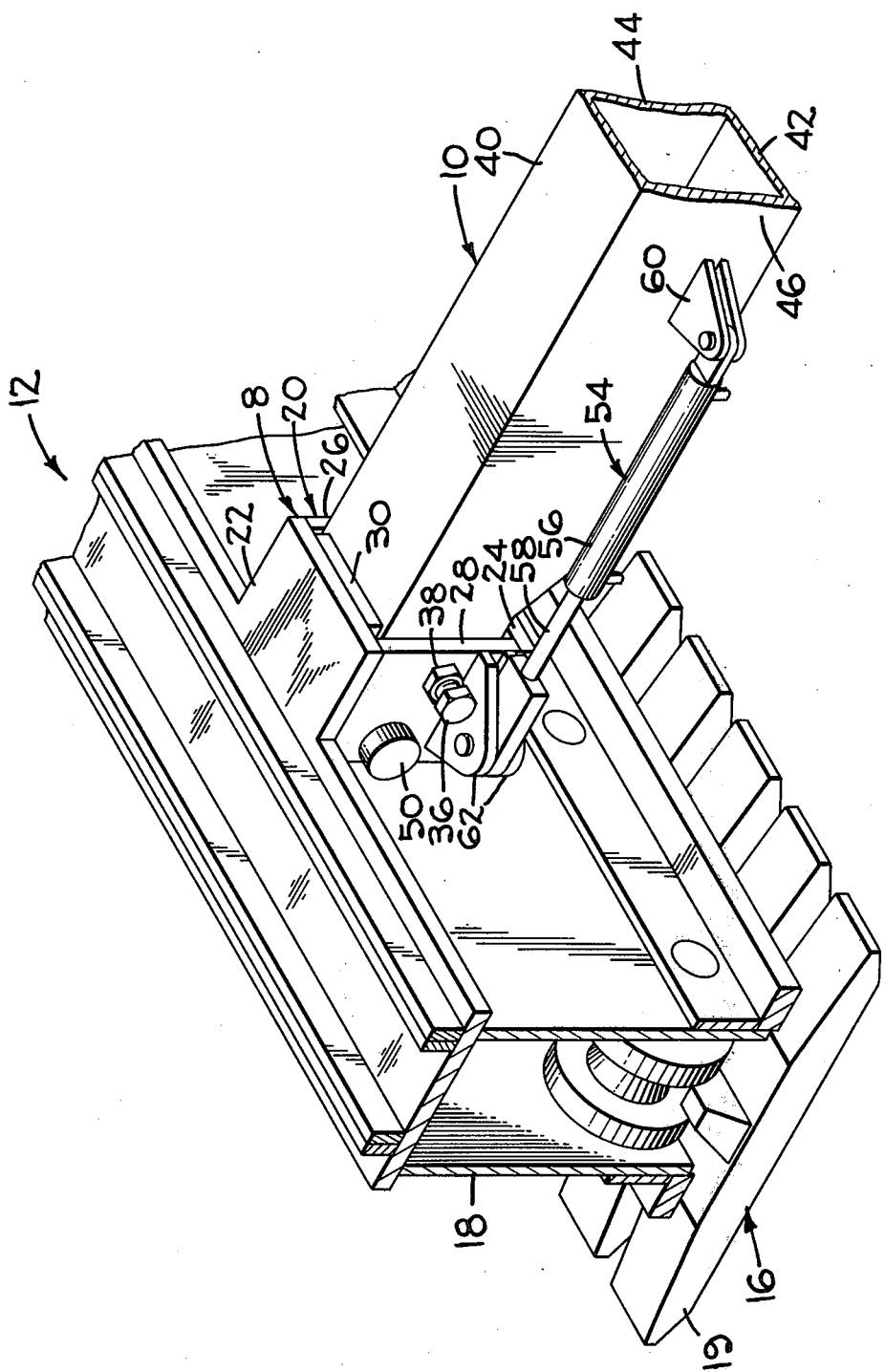

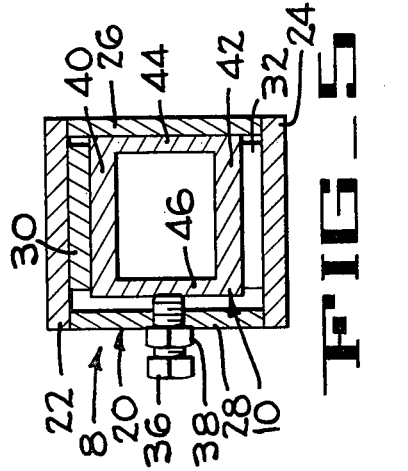
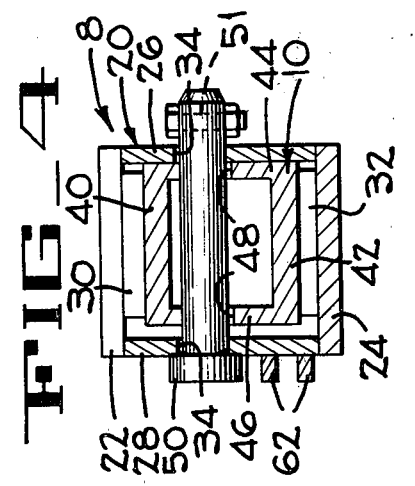
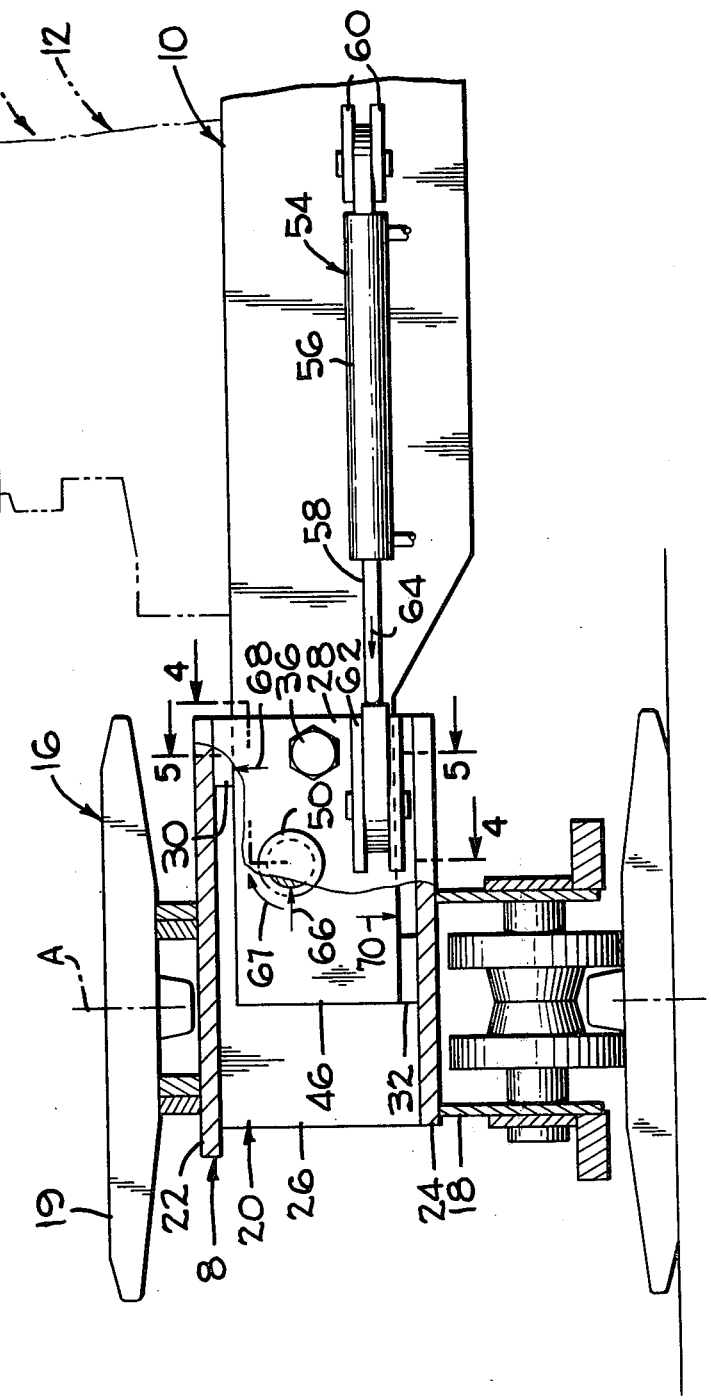

AXLE JOINT

BACKGROUND OF THE INVENTION

1. Field of the Invention

The present invention relates to axle joints for connecting axles to a removable tread member, and more particularly relates to axle joints for vehicles such as cranes or the like which provide ample clearance to assemble and disassemble the joints but effectively removes all clearance within the joint when the vehicle is in operation.

2. Description of the Prior Art

In large cranes, excavators and similar heavy equipment it is necessary to disassemble the vehicle into components small enough and light enough to be placed on trucks or trains for movement between different locations. Thereafter, the components must be reassembled to place the vehicle in operative condition. Removable axle joints for releasably connecting axles to tread members are known in the art. Such axle joints are held together by dowel pins, bar links, wedges or different types of bolting arrangements. Assembly and disassembly of these prior art joints is not only time consuming, but the joints have a tendency to work loose and develop excessive clearance during operation which is not desirable.

SUMMARY OF THE INVENTION

The axle joint of the present invention includes a tread member having an axle receiving window which is sized to provide ample clearance to readily receive an end portion of an axle. A horizontal pivot pin is inserted through apertures in the walls of the axle and window. When the vehicle is to be operated, power means connected between the axle and the tread member provide a constant force in the form of a turning moment which removes all vertical clearance from the joint. Clearance transversely of the axis of the axle is removed by other means such as a set screw and lock nut.

BRIEF DESCRIPTION OF THE DRAWINGS

FIG. 1 is a diagrammatic side elevation illustrating one tread member of a crane with a pair of axle joints connecting the axles to associated windows of the tread member, a portion of the upper works of the crane being shown in phantom lines.

FIG. 2 is an enlarged perspective of a portion of the tread member of FIG. 1 illustrating the axle joint.

FIG. 3 is an enlarged vertical section taken along lines 3—3 of FIG. 1, a portion of one wall of the window being cut away.

FIG. 4 is a vertical section taken along lines 4—4 of FIG. 3.

FIG. 5 is a vertical section taken along lines 5—5 of FIG. 3.

DESCRIPTION OF THE PREFERRED EMBODIMENT

A pair of axle joints 8 are illustrated in FIG. 1 for connection axles 10 on one side of the lower works 12 of a crane or similar vehicle 14 to one of the tread members 16. It will be understood that the other side of the crane is connected to another tread member (not shown) by two additional axle joints. Although nonextensible axles are illustrated, it will be understood that each axle joint 8 may be used in conjunction with extensible and retractable axles which are well known in the art and which permit varying the distance between two tread members.

Since all the axle joints 8 are the same, only one of the joints will be described. Also, since both tread members are substantially the same, only one tread member will be discussed.

The tread member 16 includes a tread frame 18 around which an endless track 19 is trained and driven by means (not shown) for moving the vehicle from place to place as determined by a vehicle operator. The tread frame 18 includes a pair of tubular windows 20 (FIGS. 3–5) defined by an upper wall 22, a lower wall 24, and side walls 26,28. The upper wall 22 and lower wall 24 are strengthened by force resisting bars 30 and 32 respectively. The bars 30,32 are spaced longitudinally of each other, and their axle contacting surfaces lie in parallel planes that are spaced from each other a distance somewhat greater than the vertical thickness of the end portion of the axle 10. The side walls 26,28 have aligned pivot pin holes 34, (FIG. 4) therein, and the side wall 28 is also threaded to receive a lock screw 36 (FIG. 5), which screw is held in adjusted position by a locknut 38.

As shown in FIGS. 2, 4 and 5, the end portion of each axle 10 is defined by an upper wall 40, a lower wall 42 and a pair of side walls 44,46 which have concentric holes 48 (FIG. 4) therein for receiving a pivot pin 50 when the holes 34 and 48 are aligned as best shown in FIGS. 3 and 4. Pin retaining means such as a bolt 51 (FIG. 4) is provided to prevent accidental release of the pin 50.

Power means such as a hydraulic ram 54 is provided to apply a continuous force of sufficient magnitude during operation of the vehicle to remove all clearance between the bars 30,32 and the upper and lower surfaces of the axle 10.

The hydraulic ram 54 has its cylinder case 56 pivotally connected to the axle 10 and its piston rod 58 pivotally connected to the side wall 28 of the window at a point offset from the axis of the pivot pin 50 by yokes 60,62, respectively. Thus, extension of the ram 54 will apply a force in the direction of arrow 64 which will first cause the window 20 to move toward the left (FIG. 3) until all clearance is removed from between the left side of the pin holes 34,48 and the pin 50. The pin 50 then resists further motion as indicated by arrow 66 until a clockwise turning moment indicated by arrow 67 cause the bars 30,32 to firmly engage the axle 10 and resist further clockwise pivotal movement as indicated by arrows 68,70.

The pin 50 is located a sufficient distance to the right (FIG. 3) of the longitudinal centerline A of the tread member 16 to cause the weight of the vehicle to apply an additional clockwise turning moment about the pin 44 in the direction of the arrow 67. In the event a heavy load is applied to the vehicle which lifts or tends to lift the tread member 16 off the ground, the continuous force applied by the ram 54 is sufficient to maintain firm contact between the bars 30,32 and the associated portions of the axle 10 thereby eliminating the possibility of any detrimental impact forces from occurring between the bars 30,32 and the associated axle walls as would occur if a gap was permitted to form therebetween.

Transverse movement between each window 20 and its associated axle 10 is prevented during operation by adjusting the lock screw 36 in the side wall of the window against the adjacent wall of the associated axle 10.

The screw is then locked in adjusted position by the lock nut 38.

In operation, components of a vehicle such as the illustrated crane is transported by trucks or the like to a work site where the components are then connected together and the vehicle is placed in operation. The lower works 12 and the axles 10 extending outwardly therefrom, and the two tread members 16 (only one being shown) are moved relative to each other until the axles are positioned in the associated windows 20 and the pin holes 34,48 are aligned. Each pin 50 is then inserted in the associated holes 34,48 and is locked in place by the bolt 51 to define one of the axle joints 8.

The hydraulic ram 54 is then connected between the axle 10 and the window 20 as indicated in FIG. 3. Hydraulic fluid under pressure is then directed into the ram 54 from a conventional hydraulic system (not shown) on the vehicle and at a sufficient pressure to first move the window 20 to the left (FIG. 3) until further movement is resisted as indicated by the arrow 66. Thereafter, a turning moment is applied to the axle joint in the direction indicated by arrow 67 by continued extension force applied by the ram 54 until the axle 10 is moved to one end of its pivot range and is operatively locked by hydraulic pressure into firm engagement with the bars 30,32 with the axis of the axle being parallel to the axis of the window 20. During operation of the vehicle, sufficient pressure is continuously applied to the ram 54 to maintain the axle joint 8 in locked engagement even if the associated tread member is lifted off the ground by a heavy side load carried by the vehicle.

As mentioned previously, the pin 50 is located between the longitudinal centerline of the tread member 16 and the midpoint of the vehicle 14 so that the weight of the vehicle aids the ram 54 by applying a turning moment in the direction of arrow 67. Thus, both the weight of the vehicle and the force applied by the hydraulic ram 54 cooperate to maintain the axle joint 8 in its locked position.

The windows are locked from transverse movement by tightening the lock screw 36 (FIG. 5) and locking the screw in place by locknut 38.

From the foregoing description it is apparent that a simple axle joint is provided which is easily assembled due to ample clearance between the window and the axle, and which axle joint is reliably locked from relative movement by continuously applying a turning moment of sufficient force about a pivot axis to lock the mating parts of the joint at one end of its pivot range in the pivot plane during operation of the vehicle.

Although the best mode contemplated for carrying out the present invention has been shown and described, it will be apparent that modification and variation may be made without departing from what is regarded to be the subject matter of the invention.

What is claimed is:

1. A vehicle axle joint for releasably connecting an axle to a mobile vehicle support comprising means defining a first joint member included in said mobile vehicle support, means defining a second joint member on said axle, said first and second joint members being of relative size and shape which provides ample clearance for easily moving said joint members in coupling position and for allowing a limited range of pivotal movement in a pivot plane therebetween when pivotally connected together, pivot means for releasably connecting said first and second joint members together, and turning moment applying means including power means connected between said mobile vehicle support and said axle for applying a continuous turning moment in said pivot plane for maintaining said first and second members at one end of said limited range of pivotal movement during operation of the vehicle.

2. An apparatus according to claim 1 wherein said first joint member is a tubular member and wherein said second joint member is an end portion of the axle which is received within said tubular member.

3. An apparatus according to claims 1 or 2 wherein said power means is a hydraulic ram which continuously urges said first and second members to said one end of said pivot range.

4. An apparatus according to claims 1 or 2 wherein said mobile vehicle support lies in a first vertical plane and said pivot means lies in a vertical plane parallel to said first vertical plane and at a location between said first plane and the center of mass of the vehicle.

5. An apparatus according to claims 1 or 2 wherein said mobile vehicle support is a removable tread member.

6. An apparatus according to claims 1 or 2 wherein said pivot plane is a vertical plane parallel to the longitudinal axis of said axle, and additionally comprising selectively adjustable means operatively connected between said first joint member and said second joint member for preventing relative movement of said joint members transversely of said axle.

7. A vehicle axle joint for releasably connecting the end portion of an axle to a removable tread member comprising means defining a generally tubular window in the tread member having aligned apertures therein, means defining an axle having an end portion with aligned apertures therein and arranged to be loosely received in said window means for easily assembling and disassembling the axle joint, means defining a removable pivot pin for insertion in said window and axle apertures for pivotally connecting the window and axle for movement in a pivot plane, and means including power means connected between said tread member and said axle for applying a continuous turning moment in a pivot plane causing surfaces of the axle and window to abut each other precluding further pivotal movement in one direction and thereafter firmly retaining said abutting engagement for removing all clearance during operation of the vehicle.

8. An apparatus according to claim 7 wherein said pivot plane is a vertical plane.

9. An apparatus according to claims 7 or 8 wherein said power means is a hydraulic ram connected between said window and said axle.

10. An apparatus according to claims 7 or 8 and additionally comprising force resisting bars secured to the inner surfaces of the upper and lower walls of said window, said bars being positioned diagonally of said pin and having inner surfaces for engaging upper and lower surfaces of said end portions of said axle, said inner surfaces of said bars and said upper and lower surfaces of said axle end portions being spaced apart equal amounts so that said window and said axle end portions are parallel during operation of the vehicle.

* * * * *